April 20, 1937.  A. G. T. HICKMAN  2,078,177
ROTARY AUTOMATIC FEED FOR CROSSCUT SAWS
FOR PARQUETING FLOORING AND THE LIKE
Filed March 6, 1935

INVENTOR
ALFRED G. T. HICKMAN
BY
Richards & Geier
ATTORNEYS

Patented Apr. 20, 1937

2,078,177

UNITED STATES PATENT OFFICE 2,078,177

ROTARY AUTOMATIC FEED FOR CROSSCUT SAWS FOR PARQUETING FLOORING AND THE LIKE

Alfred George Tracey Hickman, Brakpan, Union of South Africa, assignor to Hunt, Leuchars and Hepburn, Limited, Johannesburg, Transvaal, Union of South Africa, a company with limited liabilities Application March 6, 1935, Serial No. 9,597
In the Union of South Africa May 4, 1934

4 Claims. (Cl. 143—57)

This invention relates to a saw for cutting parqueting floors.

The purpose of the invention is primarily to provide an automatic feed for a three saw parqueting flooring crosscutting machine. Battens of timber of a suitable length, planed and grooved in the required manner are brought one by one into contact simultaneously with three circular saws which cut the batten into two flooring blocks.

The battens must be slightly longer than the two finished blocks so as to allow for the cuts of the saws and the small waste pieces which are trimmed off each end.

The three circular saws, which are mounted on a spindle, are spaced to allow two blocks of the correct length to be cut when the batten comes into contact with them.

The battens are fed one by one into a guide hopper which is placed vertically over the centre of three circular metal discs, which revolve on a fixed spindle. Each of these three discs has three rectangular slots cut out of their circumference at 120 degrees to each other. These slots must be of sufficient width and depth to allow one batten only to rest in them at a time.

The battens in the hopper lie on the three discs, and as the discs revolve the battens tilt, and one edge of the bottom batten drops on to the hook of the hopper, and the other edge of the bottom batten drops into one of the slots in the discs, and as the three discs continue to revolve the batten becoming released from the hook, lies in one of the series of three slots in the discs, and is steadied by a spring in the hopper, and the batten is then caught by clamps operated by cams which grip it tight, preventing any movement when the batten comes in contact with the three saws, and automatically releasing the batten when cut through by the saws. The batten (which has become two blocks and remnants) then falls by gravity from the slots on to a conveyor belt.

The rotating spindle of the three saws and the fixed spindle of the three discs are parallel, and on the same horizontal plane. The saws and the discs revolve in a reverse direction, and as the batten is carried round by the discs it enters the path of the periphery of the saws, and is cut into two blocks. The centre disc has an opening to allow the periphery of the middle saw to revolve within it, and the distance between the outside discs is shorter than the distance between the outside saws to allow the saws to revolve without coming into contact with the discs.

The discs and saws are operated by suitable power, the discs revolving slowly, while the saws are run at high speed.

The said invention is more particularly described in and illustrated by the accompanying drawing, in which.

Referring to the above figures, spindle "A" carries worm B shown dotted, which gears with worm wheel C. This worm wheel is cast solid with flange D, and is bolted to one of the circular discs E. This circular disc is connected to a centre circular disc G by stay rods or brackets F and the centre disc G is connected by rods or brackets F1 to circular disc H, the whole then rotating as one piece about shaft J, (shaft J is fixed and does not rotate). Each of these discs has a boss at the centre bored out to take a ball bearing which runs on the fixed shaft J. Shaft J is supported by brackets K at each end, and carries two cams L, which as will be seen later operate clamping devices M. Position of cams L can be varied by slackening screws M1, moving shaft and cams to the required position, then securing by screws M1. Three circular saws N securely fixed to shaft O are driven at high speed by belt and pulley P in direction of arrow Q, the centre saw being accommodated in the centre disc G by means of an opening R made solely for the clearance.

Figure 1:
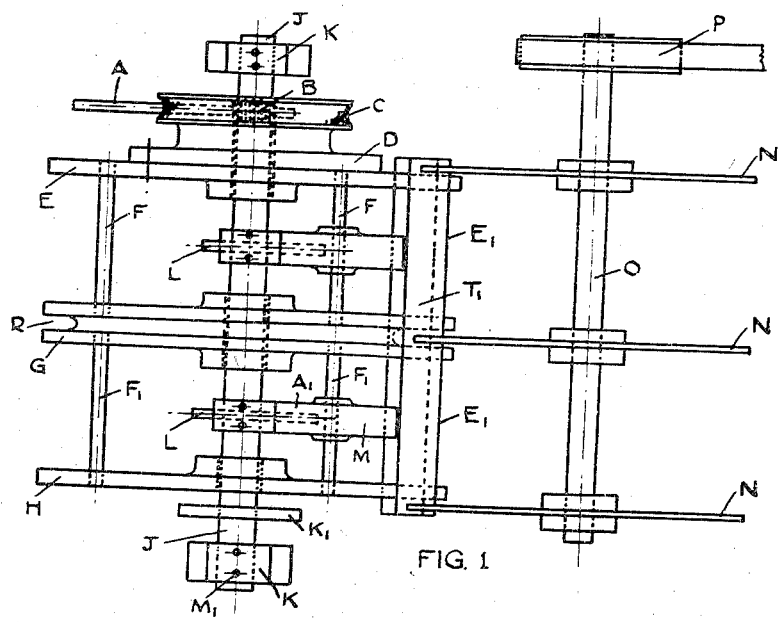
Fig. 1 is a plan of the apparatus with guide hopper S removed for clearness.
Figure 3:
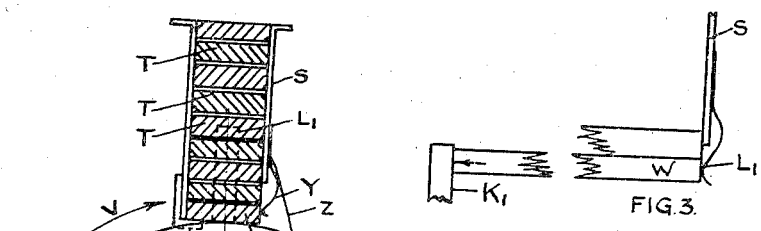
Fig. 3 shows a side elevation of spring L, pressing against corner of batten W with stop K1.
Figure 2:
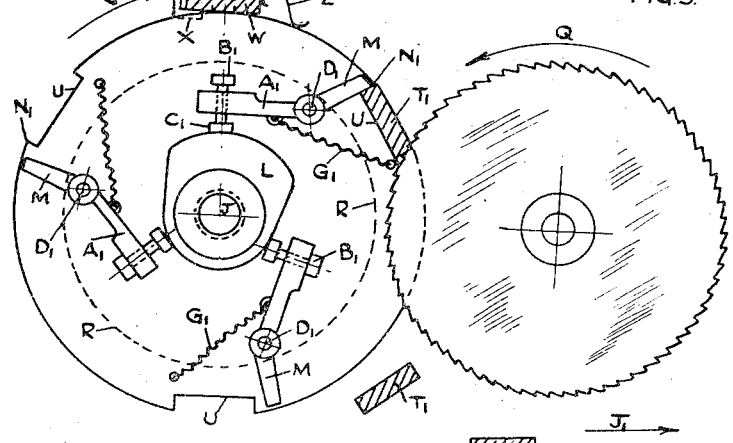
Fig. 2 shows a sectional elevation of apparatus.

In operation, guide hopper S (see Fig. 2) is filled from the top with battens, which are a loose fit, and fall to the bottom, each one in turn being brought up against stop K1 by means of a spring L1 attached to hopper S. The lower batten rests across the three discs E, G and H. The three discs mentioned have three rectangular slots U cut out of their circumference at 120 degrees to each other. These discs rotate in direction of arrow V, and when one of the openings U comes directly under hopper S the lower batten falls into it. Corner W first enters the slot as hooks X at the rear prevent it falling flat. Spring Y keeps the lower batten in place until ejected. Springs Z keep the batten pressed down in slots U until it is held by clamping device M. The following edge N1 of slot U pulls the batten away from the bottom end of hopper S. L are the cams. A1 are levers each carrying two spring loaded pins B1, the latter one being fixed to plates C1. The levers A1 pivot at D1 (supports F and F1 are utilized as pivots, or the supports F and F1 may carry brackets for the purpose) and the other arm of the lever A1 forms the clamp M which holds the batten in the slot U.

As will be seen from the drawing clamp M is holding one batten T1 which is being cut into two equal lengths E1. During the actual cutting, lever A1 with plate C1 rides on larger portion of cam L, thereby keeping the batten tight. By the time the batten is sawn through, plates C1 move down to the minimum diameter of the cam and consequently release the batten by virtue of springs G1, which keep plates C1 in contact with the cam.

When released the batten falls on to conveyor belt H1, and is taken to stock in direction of arrow J1.

I have described a three saw machine only, though if desired, my invention can be adopted for use with more than three saws, by correspondingly increasing the number of discs, and also by the use of two saws, with two discs, only trimming the ends of the batten and not cutting it into two.

Having now particularly described and ascertained the nature of my said invention and in what manner the same is to be performed, I declare that what I claim is:

1. Feeding device for crosscut saws for parqueting flooring and the like comprising the combination with a guide hopper, of a plurality of rotatable circular discs, and corresponding number of circular saws partly overlapping the periphery of said discs and adapted to rotate in a direction reverse to that of said discs, a plurality of slots in each of said discs for receiving the batten fed by said guide hopper, clamping means associated with said slots for holding the batten, a stop at one end of said guide hopper and resilient means at the other end for pressing the batten against said stop, a hook mounted on one side of said guide hopper adjacent the bottom thereof and upon which the battens rest and a spring member mounted on the opposite side for pressing the batten against said hook whereby the batten is pulled from said hopper by said slots along one edge and whereby only one batten is removed at one time, and a second spring member connected to said hopper for depressing the batten in said slots until engaged by said clamping means.

2. Feeding device for crosscut saws for parqueting flooring and the like comprising the combination with a guide hopper, of a plurality of rotatable circular discs, and corresponding number of circular saws partly overlapping the periphery of said discs and adapted to rotate in a direction reverse to that of said discs, a plurality of slots in each of said discs for receiving the batten fed by said guide hopper, a cam member fixed to each of said discs, clamping means for holding the batten in said slots comprising a two armed lever pivoted adjacent each of said slots and adapted to rotate therewith, one of said arms being in resilient contact with said cam, whereby the other arm may be pressed against the batten, said cam member being so arranged that the batten is clamped in said slots upon being fed from said guide hopper and released as soon as cut by said saws, and a stop at one end of said guide hopper and resilient means at the other end for pressing the batten against said stop, a hook mounted on one side of said guide hopper adjacent the bottom thereof and upon which the battens rest and a spring member mounted on the opposite side for pressing the batten against said hook whereby the batten is pulled from said hopper by said slots along one edge and whereby only one batten is removed at one time, and a second spring member connected to said hopper for depressing the batten in said slots until engaged by said clamping members.

3. In a feeding device for crosscut saws for parqueting flooring and the like, at least two circular discs, means connected with one of said discs for rotating the same, a rod extending through openings formed in said discs and interconnecting said discs, whereby said discs are rotatable as a unit, the circumferences of said discs having slots adapted to receive a batten, a lever mounted intermediate its ends upon said rod between said circular discs, one end of said lever being adapted to engage said batten, thereby clamping said batten in said slots, a spring connected with said lever, said spring tending to move said end of the lever away from said batten, a cam situated between said circular discs and having a surface which is in contact with the opposite end of said lever, and at least one circular saw overlapping the periphery of said circular discs for cutting said batten, said lever, while sliding over the surface of said cam clamping said batten while the latter is being cut by said saw and releasing said batten under the influence of said spring after the latter has been cut by said saw.

4. In a feeding device for crosscut saws for parqueting flooring and the like, a circular disc, at least two other circular discs situated on opposite sides of the first-mentioned circular disc, means for rotating one of said circular discs, a rod extending through openings formed in said discs and interconnecting said discs, whereby said discs are rotatable as a unit, the circumferences of said discs having slots adapted to receive a batten, levers mounted intermediate their ends upon said rod between two adjacent circular discs, said levers being adapted to press against said batten to clamp it within said slots, springs attached to said levers and tending to pull said levers away from said batten, adjustable spring-loaded pins mounted in said levers, cams situated between two adjacent circular discs and having surfaces which are in contact with said pins, circular saws equal in number to the number of said circular discs and overlapping the periphery of said discs, and means for rotating said circular saws, said cams pressing said levers against said batten while said batten is being cut by said circular saws, said levers being moved away from said batten by said springs after said batten has been cut by said saws, thereby releasing the cut portions of said batten.

ALFRED GEORGE TRACEY HICKMAN.